United States Patent [19]

Moss et al.

[11] Patent Number: 5,320,887
[45] Date of Patent: Jun. 14, 1994

[54] PLAY PEN BALLS

[75] Inventors: Howard Moss, Buckinghamshire, United Kingdom; Johan G. Modigh, Taastrup, Denmark

[73] Assignee: Euro-matic Ltd., United Kingdom

[21] Appl. No.: 26,073

[22] Filed: Mar. 4, 1993

Related U.S. Application Data

[63] Continuation of Ser. No. 842,908, Feb. 27, 1992, abandoned.

[30] Foreign Application Priority Data

Dec. 23, 1991 [GB] United Kingdom ............... 9127262

[51] Int. Cl.⁵ .............................................. A63B 39/00
[52] U.S. Cl. .............................. 428/35.7; 428/36.92; 525/240; 273/58 R; 273/58 B; 273/58 J
[58] Field of Search ................... 525/240; 260/998.14; 524/908, 413; 273/58 R, 58 B, 58 J, DIG. 5, DIG. 6, DIG. 9; 428/500, 34.1, 332, 35.7, 36.92

[56] References Cited

U.S. PATENT DOCUMENTS 4,567,219  1/1986  Tominaga et al. ............... 524/413
5,032,463  7/1991  Smith ................................ 428/520

OTHER PUBLICATIONS

Utracki et al. "Linear Low Density Polyethylenes and Their Blends": Part 4. Shear Flow of LLDPE Blends with LLDPE and LDPE, Polymer Engineering and Science vol. 27, No. 20, Nov. 1987.

*Primary Examiner*—Charles R. Nold
*Attorney, Agent, or Firm*—Ostrolenk, Faber, Gerb & Soffen

[57] ABSTRACT

Play pen balls which are blow molded from polyethylene have improved properties through being formed of a mix of linear low density polyethylene and low density polyethylene. The ratio by weight of linear low density to low density polyethylene is preferably in the region of 30%.

3 Claims, No Drawings

PLAY PEN BALLS

This is a continuation of application Ser. No. 07/842,908, filed on Feb. 27, 1992, now abandoned.

Playpen balls are hollow plastic balls normally made in low density polyethylene by a blow molding process. An example of such a process is described in GB Patent Specification No. 1,119,176.

The balls although soft are pressurized so that they regain their shape after compression. They are used successfully in play areas at public places where there is a pool of the balls, say to a depth of approximately two feet or two thirds of a meter. Children play within the pool of balls by jumping and swimming in the pool and even burying themselves in the balls. The environment is normally perfectly safe because the balls are soft and there is no risk of suffocation under these balls.

A major problem has been that continued flexing of the balls with children jumping on them causes the balls to split in use. Badly manufactured balls will split at an early stage whilst balls made to a higher standard last longer, but even these will split in time. The split occurs along an equatorial weld line and the split balls can be dangerous exposing sharp edges to the children. In addition split balls cause a lower effective level of balls in the pool which lowers the enjoyment value, reduces the safety and causes the remaining balls to be subject to harder wear.

In order to solve the problem of providing longer lasting balls, we have investigated the use of other plastics resins. These had to result in a much stronger weld while at the same time the other properties of the play ball (softness and resilience and appearance) had to remain the same.

Linear low density polyethylene is a thermo-plastic resin used for extrusion mainly in the manufacture of plastics films. Its use in blow molding is very uncommon and in fact very few, if any, resin suppliers would contemplate using or recommending use of this material for blow molding.

It has been found that balls made from 100% linear low density polyethylene (herein referred to as LLDPE) showed considerable strength and only slight variations in regard to other basic properties. There was however a significant problem in that it was difficult to remove the balls from the surrounding frame after blow molding. In the blow molding process the balls immediately after molding are normally held in the molding frame by a thin web of plastic. Using normal low density polyethylene (referred to hereafter as LDPE) the balls break away very easily leaving a smooth surface without any sharp edges on the balls. With LLDPE this was found to be impossible.

We have found that a mixture of LDPE with LLDPE provides suitable properties for the purpose and solves the above mentioned problems. The invention therefore provides a playpen ball molded from a mixture of LDPE and LLDPE resin.

Moreover we have found that the ratio of LDPE to LLDPE is of significance. At low concentrations of LLDPE in LDPE the improvement in the properties of the playpen balls is negligible whereas at very high concentrations the problem in the manufacturing process referred to above re-emerges. Within a range of 1% to 70% and preferably 5%–50% of LLDPE to LDPE satisfactory results can be achieved and particularly good results are achieved in the region of 30%.

Balls were tested by means of an impact compression machine which compresses the balls very rapidly to about 50% of their normal volume. The load is approximately 150 kilograms per ball. Normal LDPE balls will fail at 4,000 to 5,000 compressions whilst the balls manufactured in the preferred blend of LLDPE to LDPE easily survive up to 30,000 compressions.

Thus, the invention provides a ball which can be manufactured satisfactorily, has a potentially longer life and overcomes the acute problems which occur when balls break in use.

Play balls of the kind referred to in this application are generally supplied in sizes ranging in diameter from 1" to 6" but usually 2" to 3" (approximately 50 mm to 75 mm) and in weights from 10–15 grams. Generally the wall thickness will be between 0.5 and 1.5 mm (0.02 to 0.07 inches) but varies due to the flow of plastic during molding, being greatest at the equatorial weld line. Suitable apparatus for blow molding the balls is described in GB Patent Specification No. 1,119,176 and its disclosure is deemed part of this specification.

An example of the invention will now be described.

Various ratios of mix of LLDPE to LDPE were tried out, balls were blow molded, and they were tested on an impact compression machine which compresses the balls very rapidly to about 50% of their normal volume. The loading from this machine is approximately 150 kilograms per ball. Normal LDPE balls will fail at 4,000 to 5,000 compressions while the balls manufactured using the preferred blend of LLDPE to LDPE easily survived 30,000 compressions.

The LDPE resin used was Escorene linear LDPE code LL 1030×v melt index 0.5 in accordance with test D 1238.

The first test was carried out using a mix of 100% LLDPE.

The melt temperature had to be increased from 165° to 190° C. This higher temperature gave problems in the control of the parisons (material prior to final blow molding) and also in the granulation process because of the increase in temperature of the molding frames. Also the blanking out process, (i.e. removal of the joining web of plastics) was difficult because of the stiffness of the material. The appearance of the balls was unsatisfactory. Therefore the material was rejected for production of PLAYPEN balls.

Nonetheless 100% LLDPE balls were tested in the compression test machine and here we found that the balls seemed much stronger on the equatorial weld line so it was seen to be worthwhile to search for a mix of LDPE and LLDPE.

The next task was to find a mix which could be used. Therefore, we made up 50 Kg raw material in:
a. 15% LLDPE and 85% LDPE
b. 30% LLDPE and 70% LDPE Both materials were used to make balls in a standard machine of the kind shown in GB Patent Specification No. 1,119,176 and no problems were observed.

The 15% mix appeared in the compression test to be much better than standard balls because the balls withstood more than 15,000 strokes, before a weakness arose at the equatorial weld line.

Balls made from the 30% mix of LLDPE to LDPE were able to stand more than 50,000 strokes in the compression test.

The next task was to try out the 30% mix in production of 5 different colors making about 15,000 balls in each color.

This test, which covered all normal productions parameters especially the very important granulation process gave no problems and cycle time was the standard 25 sec.

In the compression test, performed on two lines of 6 balls each color was tested up to 30,000 strokes without producing broken weld lines.

It was then decided to carry out further tests to establish the optimum percentage mix, and to locate the lowest ratio and highest ratio in which we can meet the aim of the invention.

The next following table shows the results of a series of tests using varying ratios of LLDPE to LDPE.

| % LLDPE: | NUMBER OF STROKES IN COMPRESSION TEST WHEN WELDING LINE BROKEN: | BLOW MOULDING PROCESS: |
| --- | --- | --- |
| 5% | 2,000 | OK |
| 10% | 5,000–10,000 | OK |
| 20% | 12,000–15,000 | OK |
| 30% | >30,000 | OK |
| 40% | >25,000 | OK |
| 50% | >25,000 | Problems but possible |
| 60% | — | Not Possible |
| 70% | — | Not possible |
| Compression test: | 6 balls at the time. | |
| Compression: | 50% of ball diameter | |
| Pressure on 6 balls: | 710 Kg | |

-continued

| No. of strokes: | 5,500 per hour. |
| --- | --- |

These results showed that a 5% mix has very little effect on the strength of the weld line, but the balls at 10% to 20% showed an improvement, but not sufficient for the best possible result.

By 30% we achieved a very good compression test result of greater than 30,000 strokes, whereas at 40% there was no further improvement.

By 50% to 70%, production problems arose due to difficulties with the blanking out process and there were variations in the production parameters. Thus at these ratios performance was unsatisfactory.

We claim:

1. Blow molded hollow play pen balls containing pressurized air and consisting of two hemispheres of plastic material welded along an equatorial weld line to form a ball and being formed by blow molding to have a wall thickness of between 0.02 and 0.07 inches, said plastic material consisting of a mix of linear low density polyethylene and low density polyethylene, said mix consisting of a ratio of between 0.05 to 0.5 by weight of linear low density polyethylene to low density polyethylene.

2. Blow molded play pen balls according to claim 1 in which said ratio is between 0.2 and 0.4.

3. Blow molded play ben balls according to claim 2 in which said ratio is about 0.3.

* * * * *